United States Patent [19]

Hofmann

[11] Patent Number: 5,042,322
[45] Date of Patent: Aug. 27, 1991

[54] PRECISION INDEXING TABLE INCLUDING HARMONIC DRIVE

[76] Inventor: Detlev Hofmann, Hauptstr. 79, 7531 Kieselbronn, Fed. Rep. of Germany

[21] Appl. No.: 419,478

[22] Filed: Oct. 10, 1989

[51] Int. Cl.⁵ ............................................. F16H 37/02
[52] U.S. Cl. .......................................... 74/640; 74/63; 475/168
[58] Field of Search ..................... 74/63, 640; 475/168

[56] References Cited

U.S. PATENT DOCUMENTS

| | | | |
|---|---|---|---|
| 2,959,065 | 11/1960 | Musser | 74/640 X |
| 3,200,668 | 8/1965 | Janes | 74/640 |
| 3,714,848 | 2/1973 | Hofmann | 74/117 X |

FOREIGN PATENT DOCUMENTS

| | | | |
|---|---|---|---|
| WO84/01418 | 4/1984 | PCT Int'l Appl. | 475/168 |
| 501236 | 10/1976 | U.S.S.R. | 74/640 |
| 559052 | 5/1977 | U.S.S.R. | 74/640 |
| 1025941 | 6/1983 | U.S.S.R. | 475/168 |
| 1199257 | 7/1970 | United Kingdom | 475/168 |

*Primary Examiner*—Allan D. Herrmann

[57] ABSTRACT

In a harmonic drive arrangement wherein two relatively rotatable members are provided with oppositely arranged gear structures of different numbers of teeth such that the gear structures define therebetween wedge cavities of circumferentially varying cross sections, engagement balls are disposed in the wedge cavities and a biasing structure extends around the gear structure so as to be adapted to bias the balls sequentially inwardly into said wedge cavities and release them outwardly thereby causing relative motion of the two rotatable members.

6 Claims, 3 Drawing Sheets

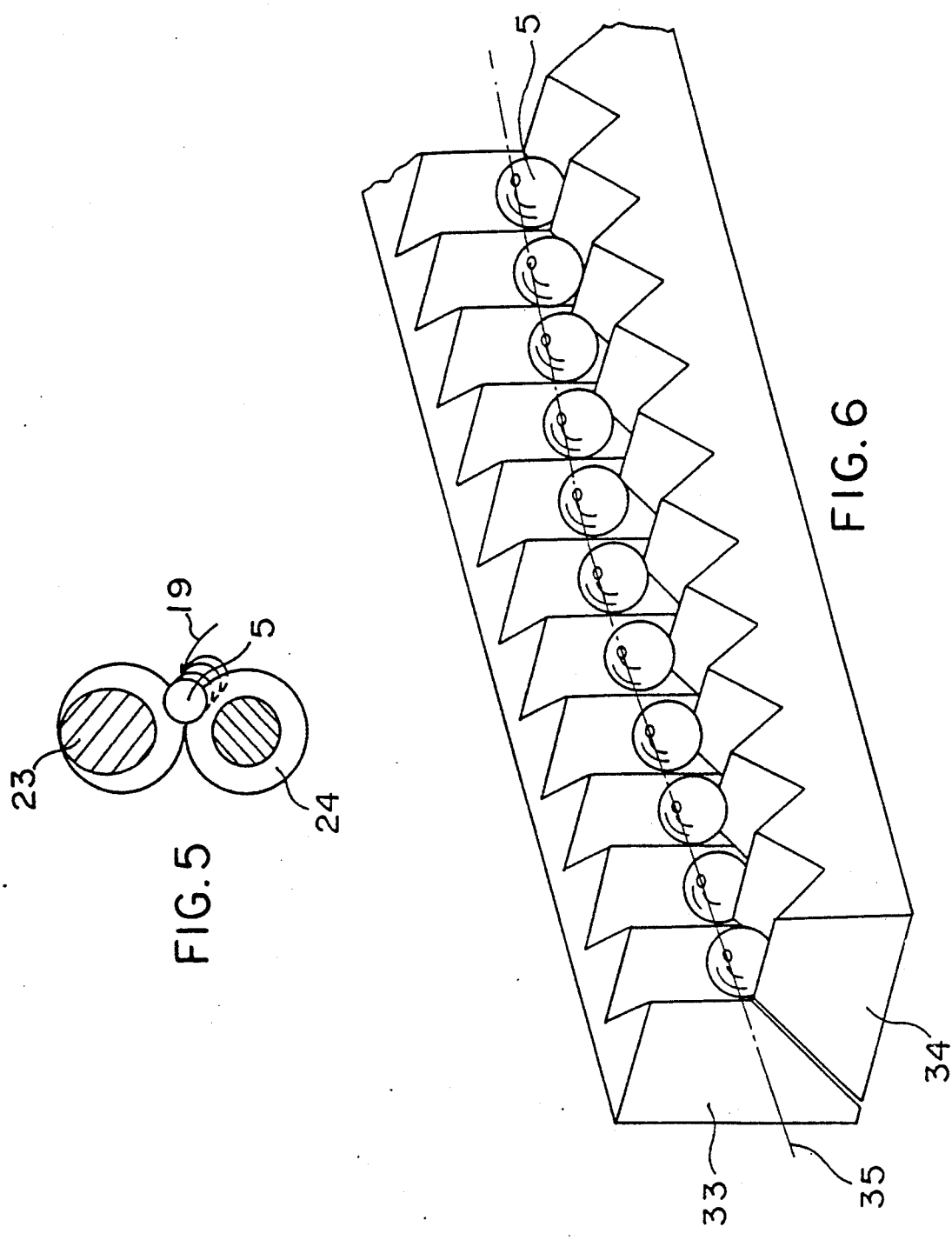

PRECISION INDEXING TABLE INCLUDING HARMONIC DRIVE

BACKGROUND OF THE INVENTION

The invention relates to a drive arrangement for precision positioning of two relatively movable members such as a work table on a support plate, that is, for angular or rectilinear position adjustment of the work table by means of a harmonic-type drive arrangement coupling the support plate and the work table with one another.

Such angular positioning arrangements are known as indexing tables. They have coupling drive arrangements being adapted to permit the generation of circle or angle divisions to predetermined adjustable values. Repeatability and accurate adjustability of the graduation of the angular settings are highly important requirements for such arrangements. It is also necessary that adjustment of small graduations on the order of angles of less than 1° can be accurately performed and such adjustments should be accurately maintained even against large forces. It is further necessary that relatively heavy workpieces can be supported and rotated on such positioning arrangements which requires relatively high drive torques.

On such indexing tables usually both the table plate and the support plate are provided with radial gear structures. For angular position adjustment the table plate is usually raised out of engagement with the support plate and rotated to the desired angular position and then again lowered into firm engagement with the support plate. The angular spacing of such tables is determined by the number of teeth of the gear structures which number however cannot be made to be too large since appropriate seating engagement of the indexing table with sufficient engagement forces is required. The raising of the table is avoided in a design known from U.S. Pat. No. 3,714,848 wherein the support plate and indexing table are provided with radial gears with teeth which are inclined toward one another at an acute angle and adapted to receive balls for locking the indexing table with the support plate. The balls however do not only lock the indexing table with the support plate but also insure their accurate positioning relative to one another without any play.

The state of the art also includes an arrangement with a harmonic drive including a cylinder provided with an internal gear structure and a resilient sleeve which has an outer gear structure and receives an elliptic rotor which forces the outer gear structure on the resilient sleeve at opposite sides into engagement with the internal gear structure of the cylinder. The resilient sleeve is stationary and its gear structure has fewer teeth (at least two) than the cylinder's gear structure for large drive speed reduction.

Such an arrangement provides for fine adjustability; however since the sleeve which is part of the drive structure is resilient and engages the cylinder only in a small area, holding torque is limited and accuracy suffers if the load to be retained is relatively large.

SUMMARY OF THE INVENTION

In order to achieve extremely accurate adjustment possibilities with high repeatability and large retaining torques, the drive arrangement for the indexing table in accordance with the invention is provided with oppositely arranged gear structures with different numbers of teeth and is arranged so as to define therebetween wedge cavities of varying cross section depending on their relative positions and engagement members, preferably engagement balls, are disposed in the wedge cavities and are biased into the cavities into engagement with the opposite gear structures sequentially along the gear structures to cause relative motion between the two relatively movable members.

Such arrangement permits accurate positioning, for example, of indexing tables or of the arms of robotic equipment.

With such a drive arrangement the balls which are biased into edge contact with the side faces of the oppositely disposed teeth of the gear structures provide for firm engagement and positioning of the indexing table and support plate relative to one another. Depending on the radial positioning of the various balls by the biasing elements the indexing angle position is adjustable in an infinitely variable manner while the table and support plate remain firmly engaged. Such an arrangement fulfills all the requirements for an indexing table or other positioning equipment in a simple, elegant manner.

Instead of providing for each of the balls an engagement member which forces the respective ball to a smaller or greater extent into the space between the respective teeth, there may be an engagement structure disposed around the gear structures and associated with one of the table and support plate so as to engage the balls for appropriate movement into and out of the gear structures. Also a cage may be provided to appropriately space the balls or the tooth spacing of the gear structures may be such that the balls are circumferentially in engagement with one another. In any case, all the balls are in engagement with some portions of the opposite gear structures at all times such that the table and support plate are always firmly held in position relative to one another.

The gear structure of the table may have, for example, one tooth less than that of the support plate and the engagement structure may be a drive ring surrounding the balls with a slightly eccentric opening whose inner wall engages the balls such that by rotation of the eccentric ring the balls at one side are forced into the gear structure and, at the opposite side, are permitted to move outwardly and over the tooth edges of one of the gears while remaining in the groove between two teeth of the other. It is also pointed out that the ring opening may be slightly elliptical with one of the gears having two fewer teeth than the other for better angular symmetry. Also the engagement ring or structure may be elastic and forced inwardly and outwardly by a surrounding drive structure.

This kind of drive arrangement will not only fulfill the requirement for firm support of the table relative to the support plate, it will also provide for an extremely large transmission ratio if the drive is large enough, that is, if the number of teeth of the gear structures is sufficiently large. With 500 teeth on one and 501 teeth on the other of the gear structures a transmission ratio, that is, a speed reduction of 500:1, can be achieved.

High rotational speeds for the engagement structure such as up to 10,000 rpm are possible and the operation remains free of play providing for high accuracy and high engagement forces at all times. Furthermore the arrangement is self adjusting since the balls are always wedged between the gears. The arrangement therefore remains free of play and free of vibrations. Since merely the balls are moved or rolled inwardly and outwardly such a transmission has also very little wear and does not require much servicing. With an appropriate combination of materials no lubricants are needed for such a drive and the drive may even be used for underwater applications. Material combinations may be steel on steel, stainless steel, plastics or ceramics.

A special field of use for the drive according to the invention based on easy zero adjustment by a high transmission ratio and on large retaining torque capability is found in robot drives for which these properties are very important.

SHORT DESCRIPTION OF THE DRAWINGS

FIG. 5 is a cross-sectional view of FIG. 4; and

FIG. 6 shows another gear arrangement with ball engagement.

DESCRIPTION OF A PREFERRED EMBODIMENT

Figure 1:
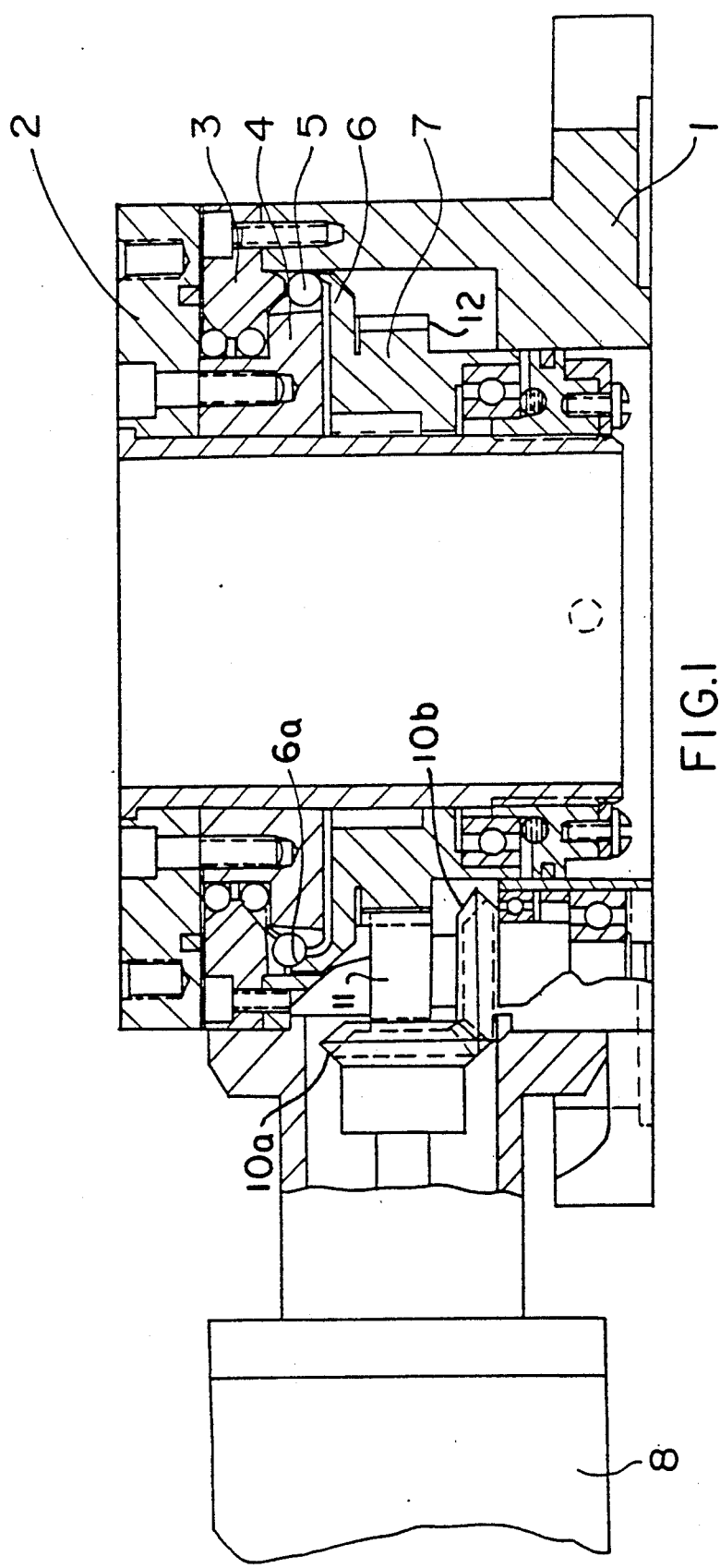
FIG. 1 shows an indexing table drive in cross section.

As shown in FIG. 1 the support plate 1 of an indexing table carries a table plate 2 such that the table plate 2 is rotatable on the support plate 1. The support plate 1 has a gear ring 3 mounted thereon and another gear ring 4 is connected to the table plate 2 such that the gear structures face one another. The gear structures are angled providing for larger spacing at their outer ends and one of the gear rings has slightly fewer teeth than the other. Balls 5 are disposed in the spaces so defined between the teeth of the adjacent gears and are biased into the spaces by the ball engaging ring structure 6 of a rotatable engagement member 7 which may be rotated by a drive motor 8 via bevel gears 10a and 10b and the spur gear 11 which are operatively connected to the bevel gear 10 and in engagement with the gear structure 12 of the engagement member 7.

Figure 2:
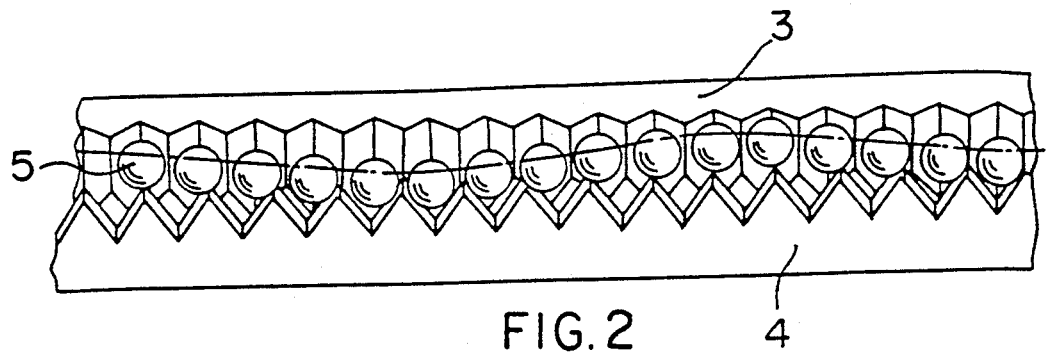
FIGS. 2 and 3 shows the ball engagement of opposite gear structures.

The ring structure 6 is curved such that the balls 5 are appropriately forced inwardly between the teeth to a smaller or greater degree as the engagement member 7 rotates. The ring structure 6 may, for example, have a circular wall structure 6a which is eccentric and inclined with respect to the axis of the gear rings and one of the gear rings has one tooth less than the other so that the balls when moving outward move up the side walls of the teeth and over the edges of the teeth into the cavity between the adjacent teeth as shown in FIG. 2, all during one full turn of the engagement member. With such a turn of the engagement member the indexing table is rotated relative to the support plate by the distance between two adjacent teeth. With such a large speed reduction, accurate adjustment of the indexing table is possible. It is noted however that the ring structure may be elliptical and the number of teeth of the two gear rings 3 and 4 differ by 2. Preferably the surfaces or side walls of the teeth extend inwardly symmetrically toward each other and form an angle relative to one another which is larger than the self-locking angle of the material of which the teeth and balls are made, but preferably not larger than 90°.

Figure 3:
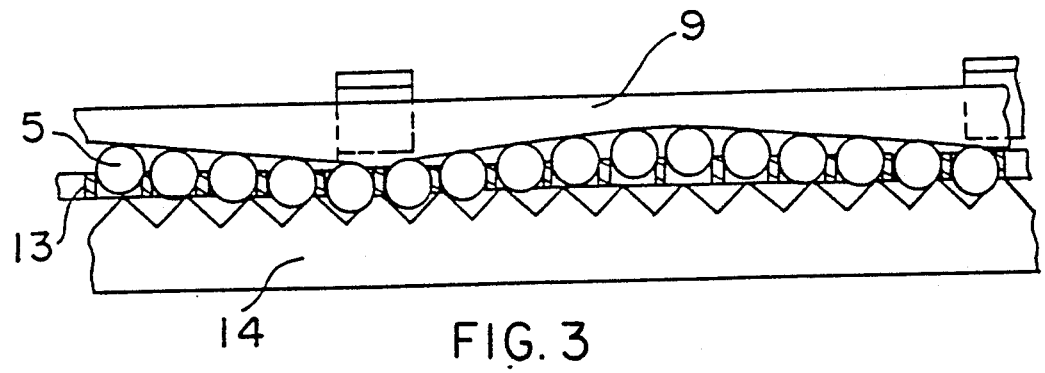

In the arrangement as shown in FIG. 3 a gear structure 14 is arranged at the bottom and the balls 5 are engaged by a cage 13 so as to be spaced somewhat less than the gear teeth and there is further provided a cam plate 9 which forces the balls more or less into the spaces between the teeth of the gear structure 14 so that the cage 13 moves slowly relative to the gear structure 14.

Figure 4:
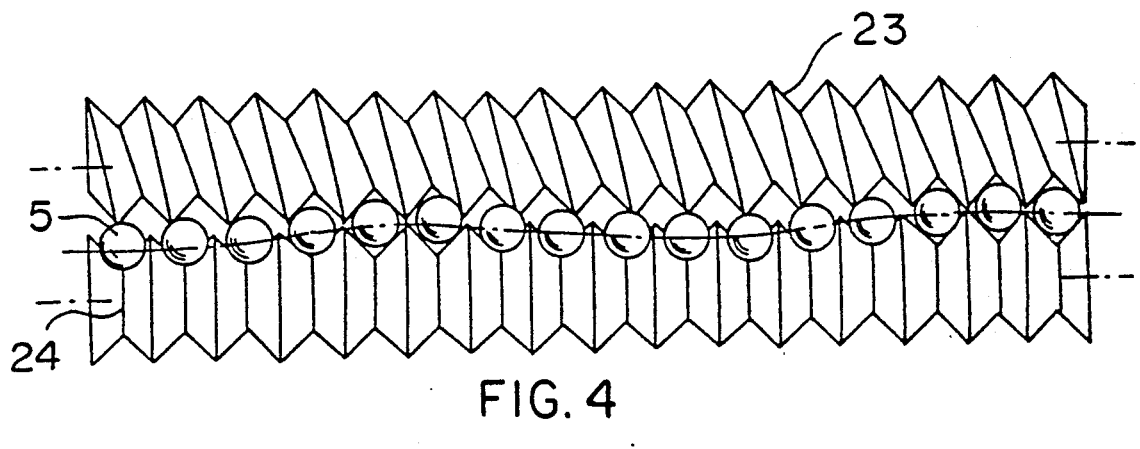
FIG. 4 shows a linear drive structure.

In the arrangement as shown in FIG. 4 the balls 5 are resiliently forced between the threads of two threaded shafts 23, 24 with slightly different pitch, of which one (24) may be rotatable.

FIG. 5 shows this arrangement in cross section. The forces applied to the balls 5 are represented by the arrow 19.

Similar to FIG. 2, FIG. 6 shows gear structures 33, 34 with the teeth arranged at right angles such that a wedge gap is formed between the structures 33 and 40 receiving the balls 5. The dash-dotted line 35 indicates a biasing structure adapted to engage the balls 5 and bias them into the carrier formed by the two relatively movable gear structures which are moved slowly relative to one another by relatively fast movement of an appropriately shaped cam biasing structure 35.

The ball engagement structure which is shown in FIG. 1 as comprising an eccentric ring or finger may also consist of circumferentially arranged electromagnetic devices with pins disposed to engage the balls and to force them into the gear cavities upon energization of magnetic devices which may be done sequentially around the gear structure to initiate rotation or relative movement of the two relatively movable members.

What is claimed is:

1. A precision indexing table comprising: a support, a table plate rotatably supported on said support, a first gear ring mounted on said support coaxially with the axis of rotation of said table plate, a second gear ring mounted on said table plate coaxially with, and below, said first gear ring, said two gear rings having gear structures of different pitch arranged adjacent one another such that they are rotatable relative to one another and said gear structures further being outwardly inclined relative to one another so as to form therebetween outwardly open spaces, a plurality of balls disposed in said spaces, a rotatable member with a curved ball retaining engaging ring structure supported on said support so as to surround said spaces for retaining said balls in said spaces and in contact with said gear structures thereby providing for firm engagement between the two gear rings and means for rotating said rotatable member for sequentially forcing said balls more or less into said spaces thereby causing movement of the table plate relative to the support while remaining in firm play-free engagement with said support.

2. An indexing table according to claim 1, wherein a drive motor is mounted on said support and provided with a gear structure in driving engagement with said rotatable retaining ball engaging ring structure.

3. An indexing table according to claim 2, wherein said ball engaging ring structure has an inclined eccentric surface adapted to provide for engagement of said balls with said gear structures with a force which depends on the load supported by the table plate.

4. An indexing table according to claim 1, wherein one of said gear rings has one tooth less than the other and said rotatable member having a ball retaning ring structure includes an eccentric circular wall structure engaging said balls so as to cause rotation of said table plate on said support by one tooth-distance upon a full turn of said rotatable member.

5. An indexing table according to claim 1, wherein the teeth have surfaces extending inwardly symmetrically toward each other and form an angle relative to one another which is larger than the self-locking angle of the material of which the teeth and balls are made.

6. An indexing table according to claim 5, wherein the angle of inclination between said teeth is up to 90°.

* * * * *